United States Patent
Xu et al.

(10) Patent No.: US 11,328,114 B2
(45) Date of Patent: *May 10, 2022

(54) BATCH-OPTIMIZED RENDER AND FETCH ARCHITECTURE

(71) Applicant: GOOGLE LLC, Mountain View, CA (US)

(72) Inventors: Hui Xu, Sunnyvale, CA (US); Rupesh Kapoor, Palo Alto, CA (US); Hao Fang, Beijing (CN); Cristian Tapus, Santa Clara, CA (US); Erik Arjan Hendriks, Kirkland, WA (US)

(73) Assignee: GOOGLE LLC, Mountain View, CA (US)

( * ) Notice: Subject to any disclaimer, the term of this patent is extended or adjusted under 35 U.S.C. 154(b) by 523 days.

This patent is subject to a terminal disclaimer.

(21) Appl. No.: 15/990,741

(22) Filed: May 28, 2018

(65) Prior Publication Data

US 2018/0276220 A1    Sep. 27, 2018

Related U.S. Application Data

(63) Continuation of application No. 14/521,206, filed on Oct. 22, 2014, now Pat. No. 9,984,130, which is a (Continued)

(51) Int. Cl.
*G06F 40/143* (2020.01)
*G06F 16/2457* (2019.01)
(Continued)

(52) U.S. Cl.
CPC ...... *G06F 40/143* (2020.01); *G06F 16/24578* (2019.01); *G06F 16/957* (2019.01); (Continued)

(58) Field of Classification Search
CPC .. G06F 16/245; G06F 16/957; G06F 16/9566; G06F 40/103; G06F 40/131; G06F 40/186; G06F 40/14
See application file for complete search history.

(56) References Cited

U.S. PATENT DOCUMENTS 5,761,683 A * 6/1998 Logan ................. G06F 16/9577
715/206
5,845,115 A    12/1998 Bennett
(Continued)

FOREIGN PATENT DOCUMENTS

CN    102663002 A    9/2012
CN    102855318 A    1/2013
(Continued)

OTHER PUBLICATIONS

First Office Action with English Translation for Chinese Application No. 201480079850 3, dated Feb. 11, 2019, 22 pages.
(Continued)

*Primary Examiner* — Thu V Huynh
(74) *Attorney, Agent, or Firm* — Brake Hughes Bellermann, LLP

(57) ABSTRACT

Implementations include a batch-optimized render and fetch architecture. An example method performed by the architecture includes receiving a request from a batch process to render a web page and initializing a virtual clock and a task list for rendering the web page. The virtual clock stands still when a request for an embedded item is outstanding and when a task is ready to run. The method may also include generating a rendering result for the web page when the virtual clock matches a run time for a stop task in the task list, and providing the rendering result to the batch process. Another example method includes receiving a request from a batch process to render a web page, identifying an embedded item in the web page, and determining, based on a (Continued)

rewrite rule, that the embedded item has content that is duplicative of content for a previously fetched embedded item.

17 Claims, 9 Drawing Sheets

Related U.S. Application Data continuation of application No. PCT/CN2014/080832, filed on Jun. 26, 2014.

(51) Int. Cl.

| | | |
|---|---|---|
| *G06F 16/957* | (2019.01) | |
| *G06F 16/955* | (2019.01) | |
| *G06F 40/103* | (2020.01) | |
| *G06F 40/131* | (2020.01) | |
| *G06F 40/186* | (2020.01) | |

(52) U.S. Cl.
CPC ........ *G06F 16/9566* (2019.01); *G06F 40/103* (2020.01); *G06F 40/131* (2020.01); *G06F 40/186* (2020.01)

(56) References Cited

U.S. PATENT DOCUMENTS

| | | | |
|---|---|---|---|
| 5,933,832 | A | 8/1999 | Suzuoka et al. |
| 6,271,840 | B1 | 8/2001 | Finseth et al. |
| 6,321,265 | B1 | 11/2001 | Najork et al. |
| 6,393,526 | B1 | 5/2002 | Crow et al. |
| 6,631,369 | B1 | 10/2003 | Meyerzon et al. |
| 6,643,641 | B1 | 11/2003 | Snyder |
| 6,665,838 | B1 | 12/2003 | Brown et al. |
| 6,704,728 | B1 | 3/2004 | Chang et al. |
| 6,714,905 | B1 | 3/2004 | Chang et al. |
| 6,865,192 | B1 | 3/2005 | Barrow |
| 6,978,298 | B1* | 12/2005 | Kuehr-McLaren ............ H04L 67/1095 709/223 |
| 7,054,917 | B1 | 5/2006 | Kirsch et al. |
| 7,275,114 | B2 | 9/2007 | Allen et al. |
| 7,536,389 | B1 | 5/2009 | Prabhakar et al. |
| 7,548,915 | B2 | 6/2009 | Ramer et al. |
| 7,613,703 | B2 | 11/2009 | Kakivaya et al. |
| 7,779,105 | B2 | 8/2010 | Uematsu et al. |
| 7,886,218 | B2 | 2/2011 | Watson |
| 8,131,753 | B2 | 3/2012 | Rybak et al. |
| 8,135,705 | B2 | 3/2012 | Beynon et al. |
| 8,156,429 | B2 | 4/2012 | Lotenberg |
| 8,271,611 | B2 | 9/2012 | Husa et al. |
| 8,316,124 | B1 | 11/2012 | Baumback et al. |
| 8,346,755 | B1 | 1/2013 | Kapoor et al. |
| 8,353,028 | B2 | 1/2013 | Lalonde et al. |
| 8,504,695 | B2 | 8/2013 | Hashimoto et al. |
| 8,527,504 | B1 | 9/2013 | Krishnamurthy |
| 8,539,359 | B2 | 9/2013 | Rapaport et al. |
| 8,543,580 | B2 | 9/2013 | Chen et al. |
| 8,578,261 | B1 | 11/2013 | Gupta et al. |
| 8,601,565 | B1 | 12/2013 | Sakata et al. |
| 8,640,017 | B1 | 1/2014 | Chang et al. |
| 8,650,493 | B2 | 2/2014 | Miller |
| 8,655,865 | B1 | 2/2014 | Sankaran et al. |
| 8,676,978 | B2 | 3/2014 | Jiang et al. |
| 8,689,117 | B1 | 4/2014 | Vasilik et al. |
| 8,707,162 | B1 | 4/2014 | Jain |
| 8,738,686 | B2 | 5/2014 | Douthart |
| 8,751,626 | B2 | 6/2014 | Pinkston et al. |
| 8,892,543 | B1 | 11/2014 | Kapoor et al. |
| 8,924,650 | B2 | 12/2014 | Ramani et al. |
| 8,924,850 | B1 | 12/2014 | Ramani et al. |
| 9,256,795 | B1 | 2/2016 | Gray et al. |
| 9,678,928 | B1* | 6/2017 | Tung ................ G06F 40/14 |
| 9,736,212 | B2 | 8/2017 | Eastham et al. |
| 9,785,720 | B2 | 10/2017 | Meng et al. |
| 9,984,130 | B2* | 5/2018 | Xu ................... G06F 16/9566 |
| 10,375,192 | B1* | 8/2019 | Lepeska ............... H04L 69/14 |
| 2002/0065842 | A1 | 5/2002 | Takagi et al. |
| 2002/0078143 | A1 | 6/2002 | De boor et al. |
| 2002/0169797 | A1* | 11/2002 | Hegde ............ H04L 29/06027 715/276 |
| 2003/0041280 | A1 | 2/2003 | Malcolm et al. |
| 2003/0172121 | A1 | 9/2003 | Evans et al. |
| 2003/0191837 | A1 | 10/2003 | Chen |
| 2003/0229677 | A1 | 12/2003 | Allan |
| 2004/0123140 | A1 | 6/2004 | Toomey |
| 2005/0055644 | A1 | 5/2005 | Stockton |
| 2005/0108339 | A1 | 5/2005 | Gleeson et al. |
| 2006/0069697 | A1 | 3/2006 | Shraim et al. |
| 2006/0074911 | A1 | 4/2006 | Neagovici-negoescu et al. |
| 2006/0106844 | A1 | 5/2006 | Naick et al. |
| 2006/0129463 | A1 | 6/2006 | Zicherman |
| 2006/0282776 | A1* | 12/2006 | Farmer ................ G11B 27/34 715/719 |
| 2007/0005652 | A1 | 1/2007 | Choi et al. |
| 2007/0061700 | A1 | 3/2007 | Kothari et al. |
| 2007/0083534 | A1* | 4/2007 | Uematsu ............ G06F 16/9577 |
| 2007/0104208 | A1 | 5/2007 | Svensson |
| 2007/0174774 | A1* | 7/2007 | Lerman ................ G11B 27/034 715/723 |
| 2007/0263984 | A1* | 11/2007 | Sterner ................ G11B 27/034 386/234 |
| 2007/0298773 | A1 | 12/2007 | Uematsu et al. |
| 2008/0010642 | A1 | 1/2008 | Maclellan et al. |
| 2008/0044016 | A1 | 2/2008 | Henzinger |
| 2008/0270659 | A1 | 10/2008 | Grewal et al. |
| 2008/0301139 | A1 | 12/2008 | Wang et al. |
| 2008/0313227 | A1* | 12/2008 | Shafton ................ G11B 27/105 |
| 2009/0070869 | A1 | 3/2009 | Fan et al. |
| 2009/0077198 | A1 | 3/2009 | Larsson et al. |
| 2009/0112844 | A1* | 4/2009 | Oro ................... G06Q 30/02 |
| 2009/0144321 | A1* | 6/2009 | Shamma ............ G06F 16/435 |
| 2009/0164502 | A1 | 6/2009 | Dasgupta et al. |
| 2009/0300768 | A1 | 12/2009 | Krishnamurthy et al. |
| 2010/0057802 | A1 | 3/2010 | Mckeeth |
| 2010/0088612 | A1 | 4/2010 | Jia et al. |
| 2010/0131488 | A1 | 5/2010 | Dasdan et al. |
| 2010/0138485 | A1 | 6/2010 | Chow et al. |
| 2010/0153544 | A1 | 6/2010 | Krassner et al. |
| 2010/0161642 | A1 | 6/2010 | Chen et al. |
| 2010/0169301 | A1 | 7/2010 | Rubanovich et al. |
| 2010/0241621 | A1 | 9/2010 | Randall |
| 2010/0262780 | A1 | 10/2010 | Mahan et al. |
| 2011/0055314 | A1 | 3/2011 | Rosenstein et al. |
| 2011/0055683 | A1 | 3/2011 | Jiang |
| 2011/0083037 | A1 | 4/2011 | Bocharov et al. |
| 2011/0099133 | A1 | 4/2011 | Chang et al. |
| 2011/0119602 | A1 | 5/2011 | Isozu |
| 2011/0167063 | A1 | 7/2011 | Tengli et al. |
| 2011/0185287 | A1 | 7/2011 | Dharmarajan et al. |
| 2011/0191309 | A1 | 8/2011 | Anderson et al. |
| 2011/0202828 | A1 | 8/2011 | Wan |
| 2011/0202924 | A1* | 8/2011 | Banguero ............ G06F 9/485 718/103 |
| 2011/0304625 | A1 | 12/2011 | Gerhard et al. |
| 2012/0036264 | A1 | 2/2012 | Jiang et al. |
| 2012/0036450 | A1* | 2/2012 | Canton ............ H04M 1/72527 715/748 |
| 2012/0158737 | A1 | 6/2012 | Levy et al. |
| 2012/0194519 | A1 | 8/2012 | Bissell et al. |
| 2012/0259833 | A1 | 10/2012 | Paduroiu |
| 2012/0303425 | A1 | 11/2012 | Katzin et al. |
| 2012/0317089 | A1 | 12/2012 | Randall |
| 2012/0323881 | A1 | 12/2012 | Liu et al. |
| 2013/0007586 | A1 | 1/2013 | Thomas |
| 2013/0117252 | A1 | 5/2013 | Samaddar et al. |
| 2013/0191360 | A1 | 7/2013 | Burkard et al. |
| 2013/0218721 | A1 | 8/2013 | Borhan et al. |
| 2014/0019953 | A1 | 1/2014 | Kolesnikov et al. |
| 2014/0053056 | A1 | 2/2014 | Weber et al. |
| 2014/0101136 | A1 | 4/2014 | Mizuno et al. |
| 2014/0189534 | A1 | 7/2014 | Liu et al. |

(56) References Cited

U.S. PATENT DOCUMENTS

| | | |
|---|---|---|
| 2014/0214788 A1 | 7/2014 | Koutrika |
| 2015/0172228 A1 | 6/2015 | Zalepa et al. |
| 2015/0371142 A1 | 12/2015 | Jain |
| 2015/0379155 A1 | 12/2015 | Meng et al. |
| 2015/0381699 A1 | 12/2015 | Eastham et al. |

FOREIGN PATENT DOCUMENTS

| | | | |
|---|---|---|---|
| CN | 102902805 | A | 1/2013 |
| CN | 102917067 | A | 2/2013 |
| EP | 1821215 | A1 | 8/2007 |
| JP | H11212889 | A | 8/1999 |
| JP | 2002297619 | A | 10/2002 |
| JP | 2011028779 | A | 2/2011 |
| JP | 2011-065488 | A | 3/2011 |
| JP | 2011221616 | A | 11/2011 |
| JP | 2012108744 | A | 6/2012 |
| JP | 2015511347 | A | 4/2015 |
| JP | 2017501512 | A | 1/2017 |
| KR | 20110101414 | A | 9/2011 |
| RU | 2409846 | C2 | 1/2011 |
| RU | 2425462 | C2 | 7/2011 |
| RU | 2453916 | C1 | 6/2012 |
| RU | 2500026 | C2 | 11/2013 |
| RU | 2502127 | C2 | 12/2013 |
| WO | 2003/012576 | A2 | 2/2003 |
| WO | 2006/043664 | A1 | 5/2008 |
| WO | 2013038320 | A1 | 3/2013 |

OTHER PUBLICATIONS

Office Action with English translation for Japanese Application No. 2018-111739, dated Apr. 1, 2019, 5 pages.
Communication pursuant to Article 94(3) for European Application No. 14896212.9, dated Feb. 8, 2019, 13 pages.
Campbell, "Testing Rx", In: "Introduction to Rx", May 30, 2014, Amazon Digital Services LLC, pp. 1-11, XP055551320.
Office Action with English translation for Russian Application No. 2017142592, dated Apr. 8, 2021, 10 pages.

* cited by examiner

BATCH-OPTIMIZED RENDER AND FETCH ARCHITECTURE

RELATED APPLICATIONS

This application is a continuation of U.S. application Ser. No. 14/521,206, filed Oct. 22, 2014, which is a continuation under 35 U.S.C. § 120 of PCT Application No. PCT/CN2014/080832, filed Jun. 26, 2014, entitled "BATCH-OPTIMIZED RENDER AND FETCH ARCHITECTURE." The disclosures of these earlier-filed applications are incorporated herewith in their entirety.

BACKGROUND

The world-wide-web is a rich source of information. Today, there are estimated to be over one trillion unique web pages. Many of these pages are dynamically created, e.g., the home page of the New York Times, and have links to embedded content such as images and videos that can affect the content and appearance of the rendered web page. For example, when a browser executes script, such as JavaScript code, this can affect how a web page appears to a user and change the content and/or visual appearance of the page after the browser has finished rendering the web page. As another example, some web pages use style sheets that tell the browser how to change the appearance of text. A typical web page can have hundreds of such additional embedded items, some of which are specifically designed for or directed to the browser rendering engine. The additional information generated by the rendering process can be helpful to downstream systems, such as an Internet search engine. While it is relatively straightforward for a single user's web browser to render a single web page in real time, it is much more difficult to render a large number of pages, such as all of the pages on the world wide web (1 trillion pages) or even just the top 1% of pages on the world wide web (10 billion pages) in real time.

SUMMARY

Implementations include a rendering server and a fetch server optimized for batch rendering of web pages for a downstream user, such as a web page indexing system. When the downstream user identifies a web page (e.g., using its URL) with one or more embedded items, the downstream user may request that the rendering server render the URL to generate a rendering result. The rendering server can include many (e.g., tens of thousands) of rendering engines. Each rendering engine simulates a browser kernel optimized for batch rendering, including use of a virtual clock that eliminates many rendering errors. During rendering, as the rendering engine discovers embedded items, the rendering engine requests the embedded items from a fetch server. The fetch server includes a data store of embedded items, keyed by an identifier for each embedded item (e.g. it's URL), and the content for that item as retrieved by a web-crawler. Before looking in the data store for the embedded item, the fetch server may rewrite the URL using rewrite rules. The rewrite rules may replace the URL with a redirect URL when content for the URL is duplicate of another embedded item (e.g., represented by the redirect URL). If a requested embedded item is a duplicate, the fetch server may rewrite the URL to use the redirect URL, which allows already-retrieved content for the redirect URL to be used instead of fetching content for the requested URL. Such de-duplication methods can dramatically reduce the actual number of crawl requests made by the fetch server and improve response time of the rendering engine. The rewrite rules may also indicate a URL is blacklisted. In some implementations, the fetch server may store the dimensions, rather than the actual content, of embedded images. When a rendering engine requests an image, the fetch server may generate a mock image having the dimensions of the image and return the mock image to the rendering engine. When the rendering engine has finished rendering the web page, it may provide a rendering result to the downstream user, such as an indexing engine, which can use the information in the rendering result to enhance the processing of the web page.

In one aspect, a computer system includes at least one processor and memory storing a data store of content for embedded items and instructions that, when executed by the at least one processor, cause the system to perform operations. The operations include receiving a request from a batch process to render a web page and identifying an embedded item in the web page. The operations also include determining, based on a rewrite rule, that the embedded item has content that is duplicative of content for a previously fetched embedded item and, in response to the determination, providing the content for the previously fetched embedded item from the data store, generating a rendering result for the web page using the content for the previously fetched embedded item, and providing the rendering result to the batch process.

One or more of the implementations of the subject matter described herein can include one or more of the following features. For example, determining that the embedded item has content that is duplicative of content for a previously fetched embedded item can include matching the embedded item to a template of the rewrite rule, the rewrite rule including a redirect identifier. In such implementations, providing the content for the previously fetched embedded item includes using the redirect identifier to locate the content for the previously fetched embedded item and/or template may include a URL without a query string.

As another example, the embedded item may be a first embedded item and the operations may also include identifying a second embedded item in the web page, determine whether the second embedded item is blacklisted, returning an error when the second embedded item is blacklisted, without fetching content for the second embedded item, and generating the rendering result without the content for the second embedded item. As another example, the operations may include use a virtual clock when generating the rendering result, the virtual clock advancing independently of real time. As another example, the operations may include use a virtual clock when generating the rendering result, where the virtual clock does not advance while waiting for the provided content of the previously fetched embedded item.

As another example, the embedded item may be a first embedded item and the operations may include identifying a second embedded item in the web page, determining that the second embedded item includes an image, generating a mock image that specifies dimensions for the second embedded item using a dimension table, and using the mock image in generating the rendering result.

In another aspect, a computer implemented method includes receiving a request, from a batch process, to render a web page, initializing a virtual clock and a task list for rendering the web page, wherein the virtual clock stands still when a request for an embedded item is outstanding and when a task is ready to run. The method also includes generating a rendering result for the web page when the virtual clock matches a run time for a stop task in the task list and providing the rendering result to the batch process.

One or more of the implementations of the subject matter described herein can include one or more of the following features. For example, initializing the task list may include adding the stop task with a run time set to a predetermined time added to the virtual clock. The predetermined time may be at least 5 seconds. As another example, the method may also include advancing the virtual clock to a run time of a task in the task list when no requests for embedded items are outstanding and only tasks with run times greater than the virtual clock are in the task list. As another example, the method may also include identifying an embedded image in the web page, requesting content for the embedded image, receiving, in response to the request, a mock image that specifies dimensions for the embedded image but has empty content, and using the mock image in generating the rendering result. As another example, the batch process may be an indexing engine and the method further includes demoting a rank for the web page based on information in the rendering result and/or using the rendering result to index dynamically generated content.

In another aspect, a method includes receiving a request from a batch rendering process for Uniform Resource Locator (URL) of an embedded item in a web page and applying rewrite rules to determine a rewritten URL. The method may also include determining whether content for the rewritten URL exists in a data store and, when the content exists, providing the content to the batch rendering process. When the content does not exist, the method may include initiating a fetch of the content, wherein the batch rendering process is configured to wait without timing out during the fetch, receiving the content from a web-crawling engine, providing the content to the batch rendering process, and storing the content in the data store. The content may be used by the batch rendering process to generate a rendering result of the web page.

One or more of the implementations of the subject matter described herein can include one or more of the following features. For example, applying rewrite rules nay include matching the URL to a template, the template being associated with a redirect URL, wherein when the URL matches the template, the redirect URL is determined to be the rewritten URL, and wherein when the URL fails to match a template, the URL is determined to be the rewritten URL. As another example, the method may also include determining that the content for the rewritten URL is stale based on a change rate or a type of the embedded item stored in the data store and, in response to the determination that the content for the rewritten URL is stale, receiving updated content from the web-crawling engine, updating the data store with the updated content, and providing the updated content as the content for rewritten URL.

In another aspect, a computer system includes at least one processor and memory storing a table of dimensions stored by image identifier, and instructions that, when executed by the at least one processor, cause the system to perform operations. The operations can include identifying an embedded image in a web page, determining dimensions for the embedded image from the table of dimensions, and generating a mock image using the dimensions. The operations may also include generating a rendering result for the web page using the mock image.

In another aspect, a computer-implemented method includes receiving a request to render a web page from a batch process and identifying at least one embedded image in the web page. The method also includes receiving a mock image from a fetch server, the mock image having dimensions of the embedded image and empty content, and generating a rendering result for the web page using the mock image. In some implementations, the method may provide the rendering result to the batch process that requested the web page.

In another aspect, a non-transitory computer-readable medium may include instructions executable by at least one processor formed in a substrate that cause a computer system to perform one or more of the methods described above.

One or more of the implementations of the subject matter described herein can be implemented so as to realize one or more of the following advantages. As one example, because the batch rendering engine is not connected to input devices (e.g., keyboard, mouse) or output devices (e.g., display, touchscreen, etc.), the rendering engine can be simpler and sleeker than an actual browser renderer, for example having a machine-friendly API rather than a user-friendly API. Also because the rendering engine does not need to display the final rendered page or interact with a user, the rendering engine can use a virtual clock that advances based on finished tasks rather than actual time, which can fast-track the rendering process and avoid common errors. For example, fetching in a batch environment can be much slower than in a personal web environment, which may lead to many time-out errors. The virtual clock hides the fetch latency, avoiding the time-out errors. The virtual clock also allows for more deterministic results. For example, in a URL that includes a date/time component, rather than replacing the date/time component with a fixed time, the system may use the value of the virtual clock. This means that not all time parameters in a web page will have the same value, but that each time a web page is rendered a particular time parameter will have the same value. This flexibility allows the system to advance time, which is important in some web pages for the correctness of the rendered result, while still ensuring the set of URLs requested remain the same across renders (which leads to less crawl requests). The system may also avoid fetching unnecessary items, e.g., blacklisted items. Storing dimensions for an image, rather than the actual content of the image, reduces the storage requirements for images in the fetch server, requires less data to be transferred to the rendering engine, and further improves the rendering time at the rendering engine. Rewriting the URL avoids fetching duplicative content, further speeding the batch rendering process.

DETAILED DESCRIPTION

To completely render a web page, the content of all of the embedded external resources in the web page must first be obtained. Such resources may include, but are not limited to, external images, JavaScript code, and style sheets. Often, the same external resource is embedded in many different web pages. While it is efficient for a single user's web browser to request an external web page resource such as the Google Analytics JavaScript code in real time (i.e., when the page in which the resource is embedded is rendered), it is neither feasible nor efficient for a batch rendering engine to do so. A batch rendering engine, for example for a web page indexing process, is designed to efficiently and quickly render a large number of web pages at a time. But fetching embedded external resources can be slow, and sometimes such resources are not important for the purposes of a batch process (e.g., without a human user to view the final rendered product). To improve processing time to render a web page in a batch environment, the rendering engine may work using a virtual clock, may work with a fetch server to avoid duplicative and unnecessary fetches, and may minimize the processing of visual or other user-oriented elements in the web page.

Figure 1:
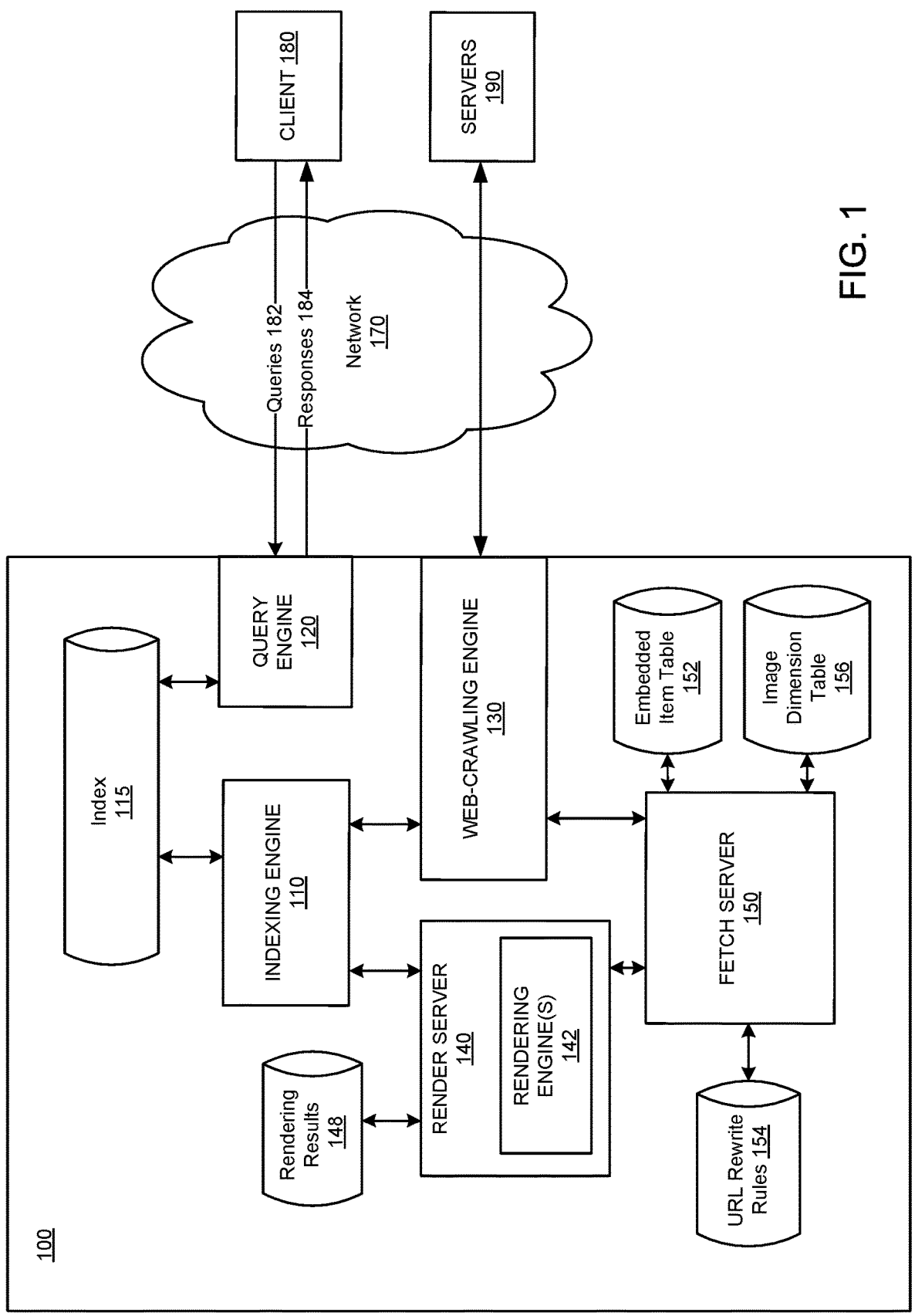
FIG. 1 illustrates an example system in accordance with the disclosed subject matter.

FIG. 1 is a block diagram of a system in accordance with an example implementation. The system 100 may be used to efficiently and quickly render web pages in a batch mode for a requesting process. The requesting process illustrated in system 100 is an indexing engine for an Internet search engine, but implementations are not limited to an indexing engine as the downstream user of the rendered web pages. For example, the requesting process may be an analysis engine to analyze a page to troubleshoot slowness or to determine if a tool, such as Google Analytics, is correctly set up, or an advertising system, or other systems that rely on automated interaction with complex web pages, e.g., filling out forms or clicking on elements. Thus, while the system 100 may be described as using batch-generated rendering result for indexing, the system 100 can be used for other batch systems where the information provided in a rendering result is useful.

Figure 8:
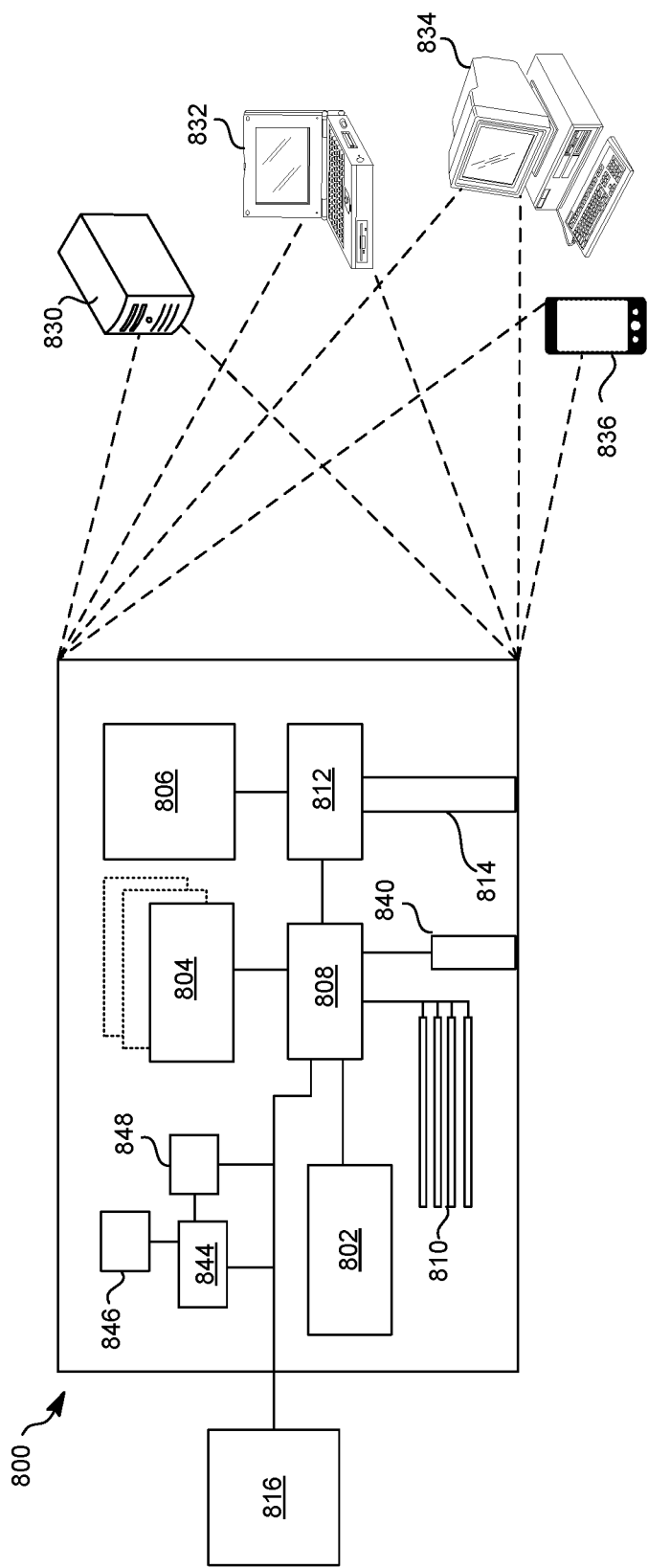
FIG. 8 shows an example of a computer device that can be used to implement the described techniques.
Figure 9:
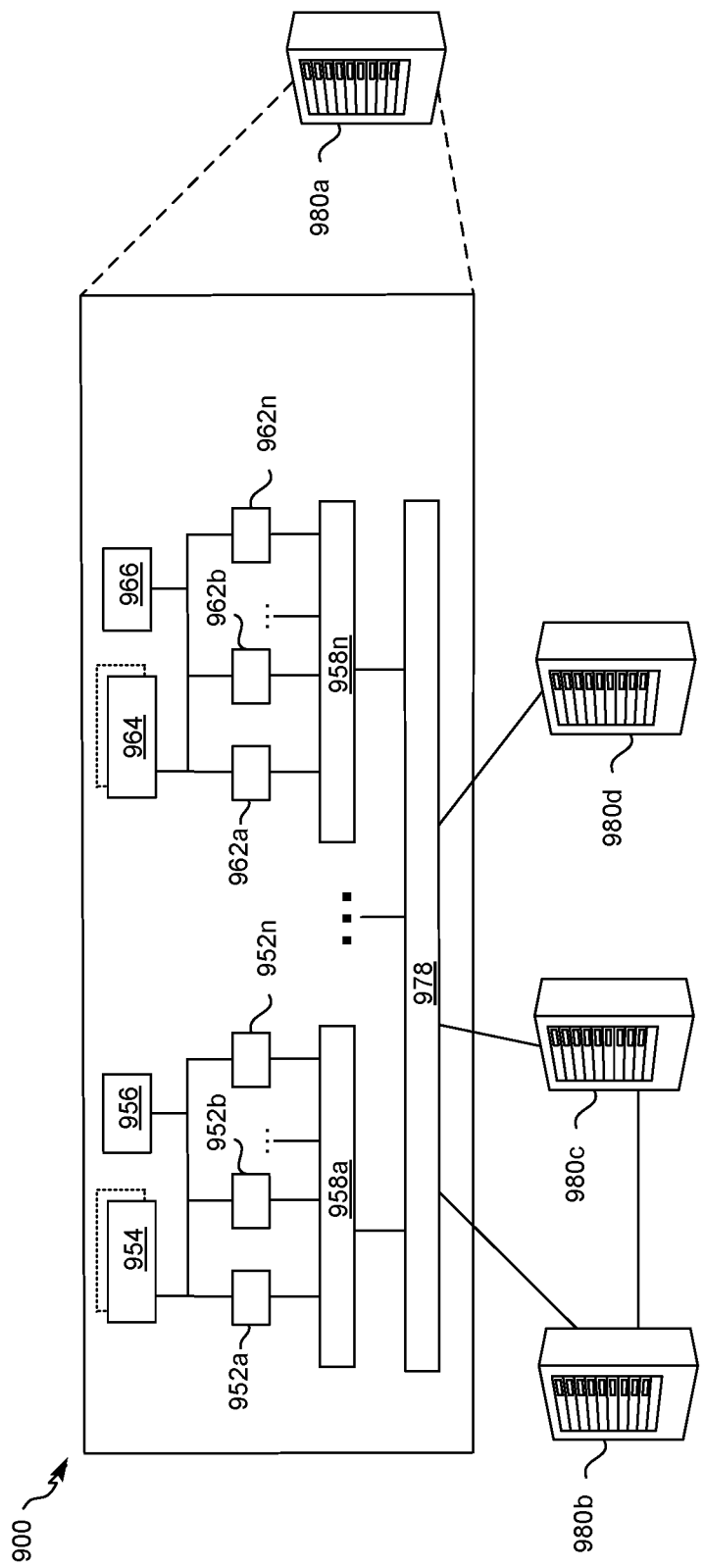
FIG. 9 shows an example of a distributed computer device that can be used to implement the described techniques.

The system 100 may be a computing device or devices that take the form of a number of different devices. For example the system 100 may be a standard server, a group of such servers, a client-server system, or a rack server system. In addition, system 100 may be implemented in a personal computer. The system 100 may be an example of computer device 800, as depicted in FIG. 8, or computer device 900, as depicted in FIG. 9.

The system 100 includes a web-crawling engine 130, a requesting process, such as indexing engine 110, a render server 140, and a fetch server 150. The web-crawling engine 130, the render server 140, and the fetch server 150 work together to efficiently render a large number of web pages, such as web pages that can be found on the World Wide Web. The result of the render of a web page is a rendering result, which includes various data elements useful to and otherwise unavailable to the requesting process.

Indexing engine 110 can include one or more processors configured to execute one or more machine executable instructions or pieces of software, firmware, or a combination thereof to create index 115. For example, the indexing engine 110 may receive information from servers 190 via web-crawling engine 130. The indexing engine 110 may process the content of the received web pages to generate the index 115. Servers 190 may be any type of computing device accessible over the Internet that hosts one or more web pages or resources embedded in one or more web pages. The web pages accessed by the crawling engine 130 may include embedded items, such as style sheets, JavaScript, images, etc., some of which may alter the content and layout of a rendered web page. While indexing engine 110 can index what is provided via the crawling engine 130, the indexing engine can ask render server 140 to provide a browser-rendered rendering result of the web page, which includes layout information and dynamic content otherwise unavailable to the indexing engine 110. The indexing engine 110 can use the rendering result content to enhance the information available about the document in the index 115. For example, the indexing engine 110 may alter the rank of a text element in the web page based on the location or size of the text in the web page image. For instance, text appearing above-the-fold (e.g., visible without scrolling) may be considered more important than text below-the-line. As another example, text in an advertisement may be considered less important to the web page. Furthermore, as some content is dynamically generated, e.g., not available until after the web page is rendered, the indexing engine 110 may use the rendering result to index dynamically generated content. Although not shown in FIG. 1 for the sake of brevity, in some implementations, the indexing engine 110 may be distributed over or more separate computing devices.

Like indexing engine 110, query engine 120 may include one or more servers that use the index 115 to identify search results for queries 182, for example, using conventional or other information retrieval techniques. Query engine 120 may include one or more servers that receive queries 182 from a requester, such as client 180. The query engine 120 may identify documents responsive to the query using index 115, and provide information from the responsive documents as search results 184 to the requester. In some implementations, the query engine 120 may also use rendering results in rendering results data store 148 to provide a thumbnail as part of the search results 184. The query engine 120 may include a ranking engine that calculates scores for the documents responsive to the query, for example, using one or more ranking signals. One or more of the ranking signals can be based on content obtained from the rendering result associated with the document. The ranking engine may rank the documents found responsive to the query using the scores.

The system may also include web-crawling engine 130. The web-crawling engine 130 can include one or more processors configured to execute one or more machine executable instructions or pieces of software, firmware, or a combination thereof. The web-crawling engine 130 may be a computing device, such as a standard server, a group of such servers, a client-server system, or a rack server system. In some implementations, the web-crawling engine 130 may share components, such as memory or hardware processors with other components of system 100, such as fetch server 150 or indexing engine 110. The web-crawling engine 130 may crawl web pages that can be found on the world-wide-web. When the web-crawling engine 130 receives the crawled web page, i.e., the contents for the crawled web page, the web-crawling engine 130 may provide the contents to the requester, which may be indexing engine 110 or fetch server 150. The web-crawling engine 130 may also store the contents in a data store (not shown) and provide the location to the requester. As used herein, the content of a web page refers to the HTML code that is provided to a web page rendering engine and used to render the web page for display in a web browser, and includes any links to external objects that are embedded in the web page, such as style sheets, JavaScript, other web pages, or image files. The web-crawling engine 130 may also be used by fetch server 150 to fetch the contents of these embedded items. The web-crawling engine 130 may provide the contents of embedded items to the fetch server 150 or may store the fetched contents in a data store, such as embedded item table 152. The web-crawling engine 130 may notify the requester when the embedded item has been crawled.

As previously mentioned, the system 100 includes a fetch server 150. The fetch server 150 can include one or more processors configured to execute one or more machine executable instructions or pieces of software, firmware, or a combination thereof. The fetch server 150 may be a computing device, such as a standard server, a group of such servers, a client-server system, or a rack server system. In some implementations, the fetch server 150 may share components, such as memory or hardware processors with other components of system 100, such as render server 140, web-crawling engine 130, or indexing engine 110. The fetch server 150 is configured to request that the web-crawling engine 130 fetch content for a particular embedded item, e.g., by its URL, and receive the fetched content and crawl time of the requested embedded item. The fetch server 150 may receive the content and fetch-time either directly from the web-crawling engine 130 or from the embedded item table 152, which the web-crawling engine 130 updates. The fetch server 150 may receive requests for the embedded items from rendering engines 142. The fetch server 150 may provide a response to the requesting rendering engine 142. The response may include the contents, either as-fetched or as-stored in the embedded item table 152, a mock image based on the image dimension table 156, or an error response. In some implementations, the fetch server 150 can provide the contents of an embedded item by sending the content and crawl time of the embedded item to the rendering engine 142 of the render server 140 that requested the embedded item. Alternatively, the fetch server 150 can provide the contents by notifying the rendering engine 142 that the content and crawl time of the embedded items are available via a specified location in the embedded item table 152, and the rendering engine 142 can retrieve the content and crawl time of the web page from that data store.

The fetch server 150 may apply URL rewrite rules 154 to the requested embedded items (e.g., the requested URLs). The URL rewrite rules 154 include rules for rewriting a URL when the URL is associated with content that is the same as another URL. This often occurs when a web-site owner wants the browser to download the content each time the resource is requested and, therefore, provides a dynamically-generated URL or a cache-busting URL. Such URLs often have a time stamp or a random string embedded as part of the URL that causes the URL to be unique each time a web page is rendered, e.g., by JavaScript that generates the cache-busting URL. However, the content for the dynamically-generated URL provided from the hosting server does not change, or does not change in a way meaningful for batch rendering purposes. The fetch server 150 may use URL rewrite rules 154 to more efficiently respond to requests for embedded items. For example the URL rewrite rules 154 may include patterns or templates, and URLs matching the template of a rule return the same content, e.g., duplicative content. In some implementations, the templates may be determined by an offline or batch process that compares the content of various URLs using a fetch log and identifying a pattern in the URL common to the URLs with duplicative content. The fetch log may be maintained, for example, by the web-crawling engine 130 or the fetch server 150. Templates may also be user-entered. If a requested embedded item has a URL that matches one of the templates, the URL rewrite rules 154 may tell the fetch server 150 that the requested item is a duplicate and direct it to rewrite the requested URL with a redirect URL, which is associated with previously fetched content, e.g., a URL with contents in the embedded item table 152. The URL of the previously fetched embedded item may be considered a redirect URL. This allows the fetch server 150 to avoid fetches unnecessarily, speeding its response to the requesting batch rendering engine 142 and eliminating stress on hosting servers caused by excessive fetch requests. Of course, if a requested URL does not match a template in the URL rewrite rules 154, rewriting the URL may result in no changes to the requested URL.

The URL rewrite rules 154 may also include patterns or templates for blacklisted URLs. If a requested embedded item matches a blacklisted URL pattern, the system may return a predetermined error rather than attempting to fetch content for the URL. Blacklisted URLs may be entered into the URL rewrite rules 154 by a user after determining that the content is not needed for batch rendering purposes. One example of this is the Google Analytics JavaScript code that many web pages include. This JavaScript code may not be considered important for the layout of the rendered page and does not need to be run for the purposes of the batch rendering engine. Thus, for rendering efficiency, some embedded items may be blacklisted using the URL rewrite rules 154. In some implementations, rather than returning an error for blacklisted URLs, the system may rewrite the URL, using a redirect URL as described above, to an entry in the embedded item table 152 that never expires and that has predetermined contents appropriate for the embedded item. In some implementations, the URL rewrite rules may flag a URL as blacklisted when it matches a template. The URL rewrite rules 154 can dramatically reduce the number of embedded items fetched via the web-crawling engine 130, improving the fetch server 150 response time to any request for resources and minimizing the fetch volume on any particular server 190. Minimizing the fetch volume ensures that the system does not overwhelm the server 190 with fetch requests. In some implementations, the fetch server 150 and/or the web-crawling engine 130 may be configured to limit the number of fetch requests directed at a server 190, and if requests exceed the limit, the system may begin to queue the requests. If the queue gets too large, the system may fail the fetch requests. Thus, the URL rewrite rules 154 can also minimize fetch volume.

In some implementations, the fetch server 150 may include image dimension table 156. Image dimension table 156 may be a key-value store that associates an image URL with known dimensions for the image. The known dimensions may be determined when the image is fetched. Using the dimensions of a requested image, the fetch server 150 may generate a mock image that has the same dimensions as the requested image but empty content or simple tiles as content. The mock image is a valid image with the same dimensions as the requested image but not the same image data. Because the fetch server 150 fetches content for a batch rendering engine, the actual image may not be important to the rendering result, but the dimensions of the image may affect the layout of the rendered page. Using a mock image rather than the actual image makes the file size very small (e.g., only tens of bytes per image), which saves network bandwidth when transmitting the mock image and processor and memory resources for the batch rendering engine. In some implementations, the image dimension table 156 may be a key-value store, such as an SSTable, but the dimension table 156 may be any data structure that stores the dimensions by image identifier.

The system 100 may include embedded item table 152. The embedded item table 152 may be keyed by URL and may store the fetched content for an embedded item returned from the web-crawling engine 130. In some implementations, the embedded item table 152 may also store a crawl history. For example, in some implementations the embedded item table 152 may include content fetched over a period of time, for example seven days, two weeks, etc. The embedded item table 152 may also include a change rate based on the crawling history. In some implementations, the embedded item table 152 may be implemented as a BigTable, a relational database, a Hadoop Distributed File, etc. The fetch server 150 may use the embedded item table 152 to quickly return contents for previously fetched embedded items. Because the fetch server 150 can processes requests for thousands of batch rendering engines, there is a high likelihood that a requested embedded item has been fetched before in response to an earlier fetch request. When the fetched contents are located in the embedded item table 152 the fetch server 150 may respond to the request using the contents in the embedded item table 152 rather than asking the web-crawling engine 130 to provide the contents. This eases the burden on the servers 190 that store the fetched contents and allows the fetch server 150 to respond more quickly to requests for embedded items. Fetch server 150 can further reduce crawl requests by de-duplicating URLs using URL rewrite rules 154.

If, at any stage of the rendering process, the content of one or more of the requested embedded items is not stored in the embedded item table 152 or is stale, the fetch server 150 may instruct the web-crawling engine 130 to schedule a crawl of the requested embedded item. Once the web-crawling engine 130 has crawled the requested embedded item, it notifies the fetch server 150. The fetch server 150 may then store the fetched content in the embedded item table 152, along with a crawl-time. If the embedded item is an image, the fetch server 150 may, alternatively or additionally, store the dimensions of the fetched image in image dimension table 156, along with the crawl time. The fetch server 150 may then send the requested content, or for image files may send a mock image with the image dimensions, back to the requesting rendering engine 142.

The system 100 includes a render server 140. The render server 140 can include one or more processors configured to execute one or more machine executable instructions or pieces of software, firmware, or a combination thereof. The render server 140 may be a computing device, such as a standard server, a group of such servers, a client-server system, or a rack server system. In some implementations, the render server 140 may share components, such as memory or hardware processors with other components of system 100, such as fetch server 150 or indexing engine 110. The render sever 140 receives a request from the indexing engine 110, or other requesting process, to render a particular web page. In other words, the render server 140 may receive the URL of a requested web page. The render server 140 may include one or many rendering engines 142. In some implementations the render server 140 include tens of thousands of rendering engines 142 and may perform load-balancing to select a rendering engine 142 to render the web page. Once a rendering engine 142 is selected, the rendering engine 142 attempts to render the web page to a rendering result. The web page may be referred to as the embedder web page because it typically includes additional embedded items.

Each rendering engine 142 is configured to emulate a renderer for personal web browser, but with optimizations for batch rendering. Accordingly, after a rendering engine 142 receives the embedder web page it may begin to populate a task list, the tasks representing work the rendering engine 142 does to generate a rendering result. While many tasks may be scheduled to run immediately, some tasks may be scheduled in the future. One of the batch optimizations for rendering engine 142 is to use a virtual clock and add a task to the task list that indicates rendering is complete at a predetermined time. For example, in some implementations the task may indicate rendering is complete at the current time plus 20 seconds. The predetermined time may be based on a time in which a majority of web page designers will design a web page to look complete, e.g., any animations or layout changes are designed to be finished within the predetermined time. Because most users do not appreciate waiting very long for a page to load, the predetermined time can be between 5 and 20 seconds, although it may be longer for some situations. The rendering engine 142 will not take the entire 20 seconds due to the use of the virtual clock, and often a full render may occur in a few seconds if embedded items do not have be crawled (e.g., the fetch server 150 can locate the contents in the embedded items table 152). Thus, a task that generates the final rendering result may be added to the task list, with a start time 20 seconds from the current time. The current time is based on the initialized time of the virtual clock, which can be zero or the current time of a real clock.

As part of the rendering process, e.g., one of the rendering tasks, the rendering engine 142 may determine whether the embedder web page includes any embedded items, such as style sheets, image files, Java script, and the like. These embedded items are referred to as primary embedded objects. If the web page does not contain any embedded objects, the rendering engine can immediately process the web page to a rendering result, and may store the rendering result in the rendering results data store 148. If, however, the web page contains embedded items, the rendering engine 142 may extract all embedded items and send a request to fetch server 150 for the content of the embedded items. The requested embedded items are each represented by a respective URL. The rendering engine 142, however, does not stop rendering or time out while waiting for the fetched resource. Rather, because the rendering engine 142 uses a virtual clock, as will be explained in more detail below, waiting for a resource to be fetched via the web-crawling engine 130 does not advance the clock and the rendering engine 142 does not time out.

When the content for a requested embedded item is received, the rendering engine 142 may add tasks to the task list to process the content. Part of processing the content may include discovering whether the requested embedded object (i.e., the primary embedded object) itself has embedded objects (i.e., secondary embedded objects). If the primary embedded object does not contain secondary embedded objects, the rendering engine 142 can continue working on rendering tasks (e.g., executing JavaScript code) changing image properties. If, however, the primary embedded object contains one or more secondary embedded objects, the rendering engine 142 requests the secondary embedded objects from the fetch server 150. This process of discovering and requesting embedded objects is repeated until the rendering engine has discovered, requested, and received the content of all of the objects that are embedded in the web page to be rendered (e.g., primary, secondary, tertiary, etc.).

Each embedded item request may be a task in the task list that is removed once the fetch server 150 returns the content for the time. When content is returned, the rendering engine 142 may add tasks for processing the content, which in turn may add additional tasks, such as changing the opacity on an image, running a script, etc. Each task may be associated with a run time. Some tasks may have a future run time. For example, to fade in (or out) an image, the browser may add several tasks to the task list, each changing the opacity of the image over intervals of time. As will be explained in more detail below, the rendering engine 142 may use a virtual clock rather than real-time in relation to the task list to determine when a task is ready to run.

The rendering engine 142 works on the process rendering tasks in the task list until the rendering is complete, e g., a rendering result is generated. The rendering engine 142 may then store the rendering result in the rendering results data store 148 and/or provide the rendering result to the requesting process (e.g., indexing engine 110). The requesting process, such as indexing engine 110, may then use information extracted from the rendering result in processing the web page. For example, the requesting process may use JavaScript errors, layout information, style information, ad space information, a list of resources fetched, performance statistics, etc., all of which may be included in a rendering result but not otherwise available to the requesting process.

The system 100 may be in communication with the client(s) 180 and servers 190 over network 170. Network 170 may be for example, the Internet or the network 170 can be a wired or wireless local area network (LAN), wide area network (WAN), a combination of these, etc., implemented using, for example, gateway devices, bridges, switches, and/or so forth. Via the network 170, the query engine, the web-crawling engine 130 and/or the fetch server 150 may communicate with and transmit data to/from clients 180 and/or servers 190.

The system 100 may also include other components not illustrated for brevity. For example, one or more of the indexing engine 110, the query engine 120, the web-crawling engine 130, the render server 140, and the fetch server 150 may be distributed across one or more computing devices. Similarly, index 115, rendering results data store 148, embedded item table 152, and image dimension table 156 may also be stored across multiple computing devices. In some implementations the various components of system 100 may share hardware components of a computing device, or may be logical partitions of the same computing device.

Figure 2:
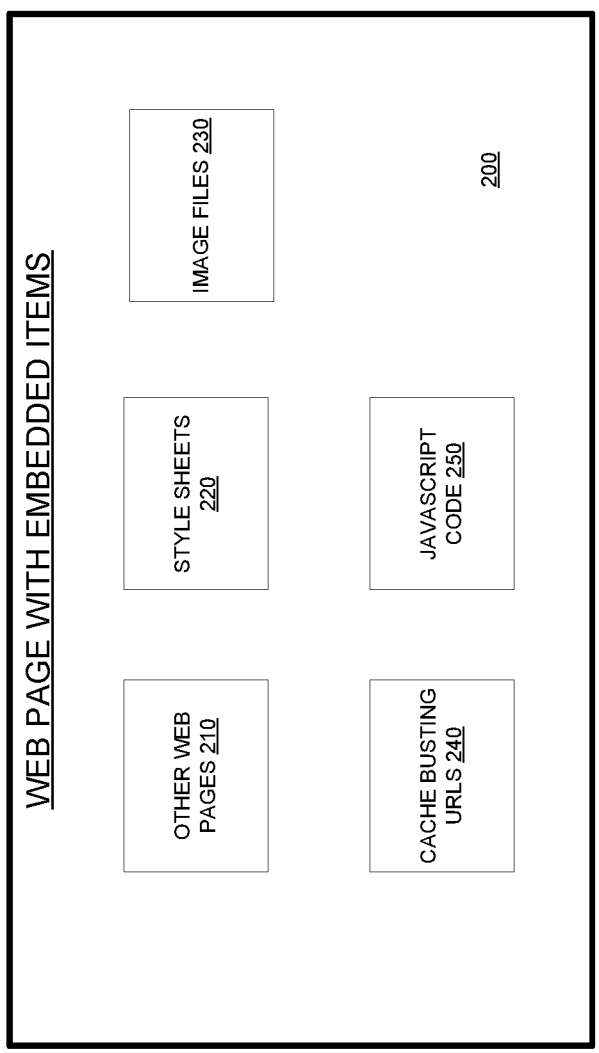
FIG. 2 is a block diagram of a web page having embedded items.

FIG. 2 is a block diagram of a web page having embedded objects. As shown in the figure, a web page 200 can contain a plurality of embedded items. These embedded objects can include, but are not limited to, other web pages 210, style sheets 220, image files 230, so-called cache-busting URLs 240, and JavaScript code 250. Additional, and different types of embedded objects, are of course possible. Moreover, each of the objects that are embedded in web page 200 may embed other objects. For example, a web page 210 that is embedded in web page 200 may embed other web pages, image files, style sheets and the like. Likewise, a style sheet 220 that is embedded in web page 200 may embed other objects such as a background image file. Further, each of the objects that are embedded in web page 210 or style sheet 220 may themselves embed even more objects. To completely render such a web page to an image file, a batch rendering engine must request each of the embedded objects 210-250 (primary embedded objects), all of the objects (secondary embedded objects) that are embedded in the embedded objects 210-250, and all of the objects (tertiary embedded objects) that are embedded in the objects that are embedded in embedded objects 210-250, and so on.

As discussed above, while an individual user's web browser can efficiently request all of these embedded objects and use them to completely render and display web page 200 in real time, a batch rendering engine can be optimized so that it does not fetch duplicative or unnecessary content, so that it does not time out waiting for the content of embedded objects, and so that it finishes the rendering as quickly as possible, regardless of internal timing for tasks. Thus, to efficiently render a large number of crawled web pages to rendering results, a system such as that disclosed in FIG. 1 can be employed.

Figure 3:
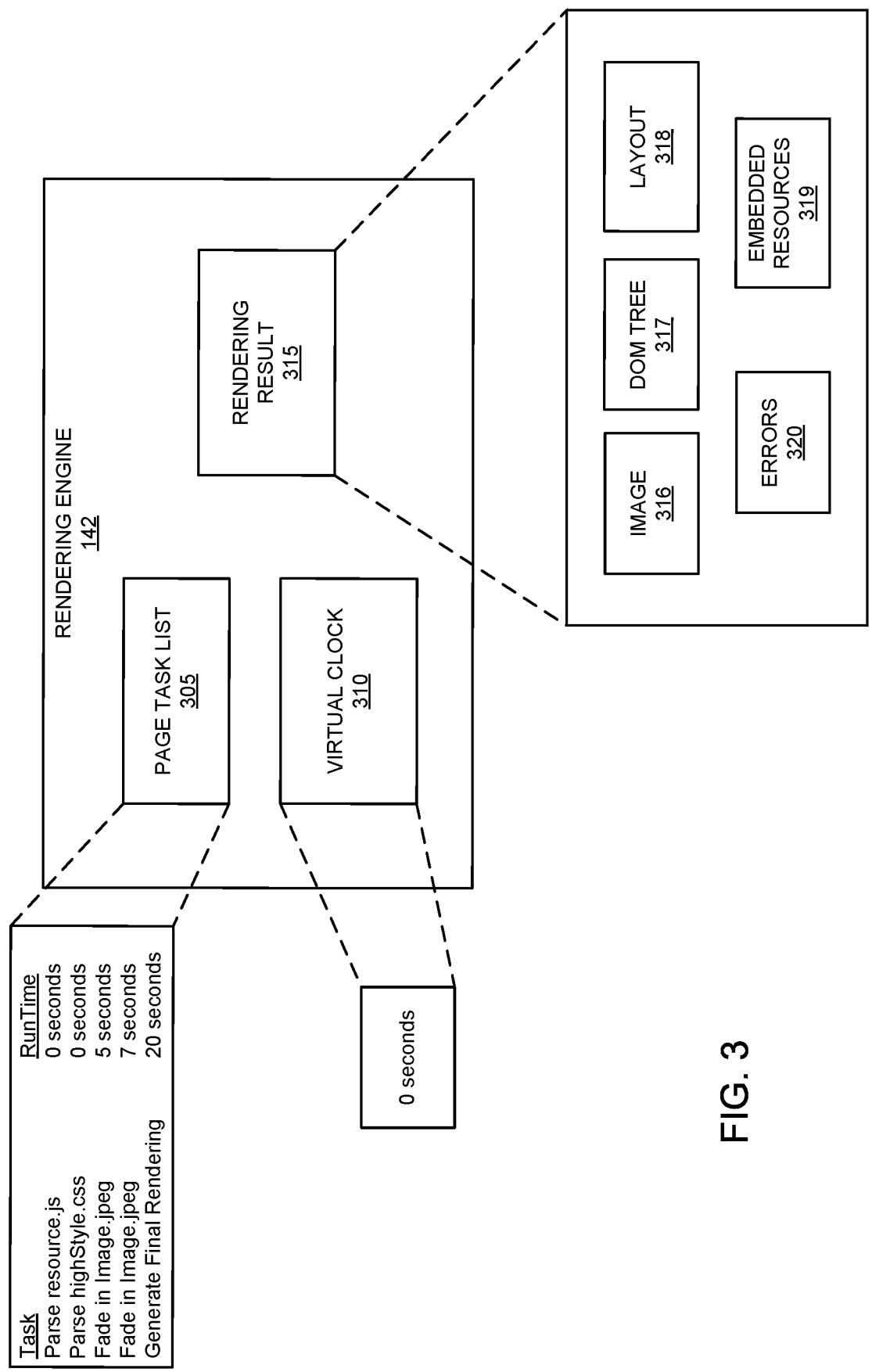
FIG. 3 is a block diagram of a batch rendering engine, according to an implementation.

FIG. 3 is a block diagram of some components of batch rendering engine 142, according to an implementation. The batch rendering engine may include additional components not illustrated in FIG. 3. The batch rendering engine 142 includes a page task list 305, a virtual clock 310, and a rendering result 315. The virtual clock 310 may be used to warp the timeline for loading a web page and to avoid a multitude of errors that can occur due to waiting for fetched resources. The virtual clock 310 may be initialized to zero or the current clock time at the start of the rendering process and may advance only when the rendering engine is not waiting for a fetch of an embedded item and when there are no tasks in the page task list 305 that are ready to run at the current time. When the virtual clock is advanced, the rendering engine 142 advances the virtual clock 310 based on the page task list 305. In other words, the rendering engine 142 advances the virtual clock 310 to the time represented by the next-occurring task. In this sense, fetching an embedded item and running JavaScript takes no virtual time, which can avoid an entire class of errors encountered by a live (or personal) browser. Furthermore, the rendering process may finish in real-time much faster than the times specified in the task list. For example, although the task "Generate Final Rendering" is set to occur at 20 seconds, the virtual clock typically advances to 20 seconds in a few actual seconds, depending on how long it takes to actually finish the tasks in the page task list 305. The "Generate Final Rendering" tasks in page task list 305 is an example of a Stop task that tells the batch rendering engine 142 when the render is finished.

The rendering engine 142 may render a rendering result 315 of the embedder web page. The rendering result 315 may include a variety of components. For example, the rendering result 315 can include an image 316 of the rendered page. The image 316 may be the image that would be displayed to a user of a live (or personal) web browser and can be used, for example, to display a thumbnail of the rendered page to a user. The rendering result 315 can also include a Document Object Model (DOM) tree 317. The DOM tree 317 represents the HTML structure of the web page. For example, the system may determine tokens, or the text of a document visible to a user, by processing the DOM tree. The rendering result 315 may also include layout 318. Layout 318 includes a box for each element of the web page, the box specifying the coordinates of the element in the image 316. For example, the layout can include box representations of DOM nodes in the DOM tree (although not every DOM elements may have a corresponding render box). The boxes can be organized in a tree structure, also known as a render tree. Thus, for example, a table may be represented by a box in the layout, and a paragraph may be represented by another box in the layout. Thus, the layout 318 provides an indication of where on the web page an element occurs, how much space it takes on the web page, etc. Thus, the layout 318 provides information on how much of the web page is ads, how prominent a paragraph is (e.g., above-the-fold or below-the-fold), whether the element is visible, etc. The layout 318 thus provides geometric information about the elements of the web page. The rendering result 315 may also include errors 320. Errors 320 include errors encountered as a result of running script, e.g., JavaScript. The rendering result 315 may also include a list of embedded resources 319 fetched during the rendering, and can include other elements generated as part of the rendering process. Thus, the rendering result 315 provides information not available to the requesting process solely via a fetch of content from the hosting server. An indexing engine, for example, can use the rendering result information to rank the element in the index, to avoid providing invisible elements as part of a snippet, and to index dynamically-generated content. Dynamically-generated content is content that exists after rendering the web page but not in the as-crawled content.

Figure 4:
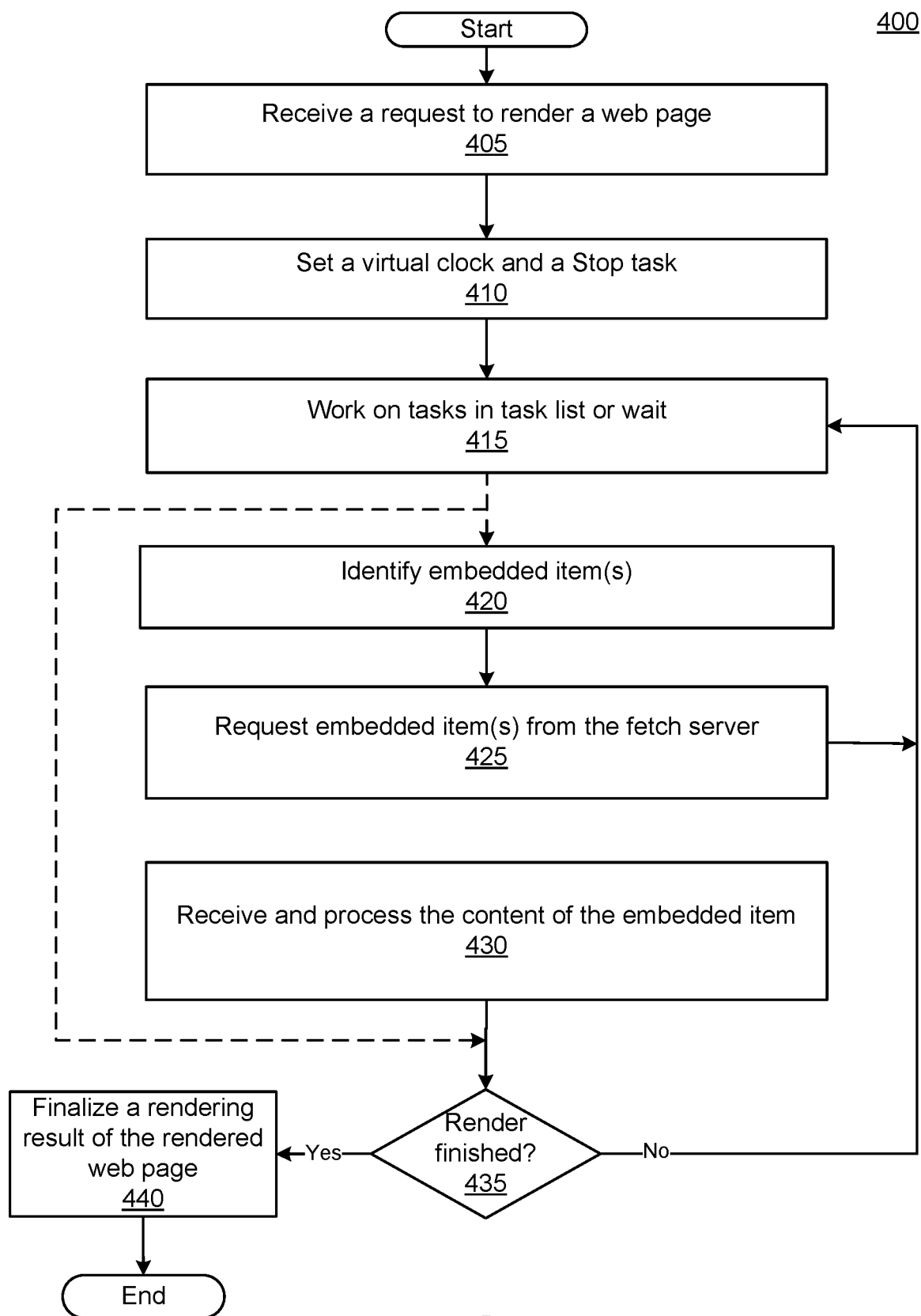
FIG. 4 is a flowchart illustrating an example process by which a batch rendering engine can render a web page having embedded objects, according to an implementation.

FIG. 4 is a flowchart illustrating an example process 400 by which a batch rendering engine can render a web page having embedded objects, according to an implementation. The process 400 may be performed by a system, such as system 100 of FIG. 1. The system may use process 400 to generate a rendering result of a web page in a batch mode at the request of a downstream process, such as an advertising system or an Internet indexing system. In some implementations, process 400 may be performed by a batch rendering engine of a rendering server and may be initiated in response to a request from a requesting process.

Process 400 may begin with receiving a request to render a web page (405). In some implementations the request may include the URL and/or the fetched content of the requested web page and associated metadata (e.g., crawl time). In some implementations, rather than receiving the content of the web page, the batch rendering engine can receive a notification that the content of the web page is available in a database and can retrieve the content and associated metadata (e.g., crawl time) from the database. The fetched content may be provided because, for example, the requesting process has already fetched the content. The batch rendering engine may begin rendering by initializing a virtual clock and adding a Stop task to the task list (410). For example, the batch rendering engine may set the virtual clock to zero and add a Stop task to the task list that causes the rendering engine to determine rendering is complete at a predetermined time. The run time associated with this Stop task may be a time in which most web pages finish loading on an individual user's machine. For example, the time may be 15 or 20 seconds. As part of beginning the rendering, the batch rendering engine may also add other tasks to the task list, such as fetching the content for the web page (if the content was not provided), and processing the content for the web page. These tasks may be added with a virtual time of zero, so they can start immediately, for example.

The batch rendering engine may then begin working on the tasks in the task list (415). For example, as part of processing the content for the web page, the batch rendering engine may identify one or more embedded items (420). The batch rendering engine may then request the contents of the embedded items from a fetch server (425). The fetch server may be the fetch server 150 of FIG. 1. In some implementations, the batch rendering engine may keep track of which embedded items it identified and whether or not the fetch server has returned the content for the respective embedded items. In some implementations, this list of embedded items may be included in the rendering result for the web page. After the batch rendering engine has requested the embedded item, the batch rendering engine may continue working on other tasks (415) that are ready to run while waiting for the fetch server to return the contents. If there are no tasks ready to run at the current virtual time or the batch rendering engine may wait for a response from the fetch server. While a fetch is outstanding, the batch rendering engine does not advance the virtual clock and, thus, the batch rendering engine does not time out waiting for a fetch.

When a response from the fetch server is received, the batch rendering engine may process the content of the embedded item (430). For example, in response to receiving the content the batch rendering engine may add tasks, such as parsing the received content for embedded items, to the task list. These tasks may be given a start time of the current virtual clock, which indicates the task is ready to run (e.g., the current time on the virtual clock). Parsing received content, whether for the originally requested web page or for an embedded item, may cause the batch rendering process to add additional tasks to the task list. For example, parsing the content for an embedded item may discover additional embedded items (e.g., secondary embedded items), which may cause the batch rendering engine to request the embedded items and parse their content when they are returned. If the content includes script, for example JavaScript, running the script may cause additional tasks to be performed, such as generating the layout or changing the appearance of one or more elements of the web page. Some of these tasks may be scheduled to start in the future. For example, changing the opacity of an image at fixed intervals makes the image appear to the user as if it is fading in. Each change in opacity is a task and the script may cause several such tasks to be added to the task list, each with a run time of the current virtual clock plus a specified amount.

As part of the rendering process, the batch rendering engine may determine whether the render is finished (435). This determination may be done, for example, each time the batch rendering engine completes a task or at predetermined time intervals, etc. The render may be finished when the virtual clock reaches the time specified in the Stop task. Because the virtual clock does not advance while a fetch of an embedded item is outstanding, when the virtual clock does reach the time specified in the Stop task the batch rendering engine is assured to have received a response for each fetch request. Thus, the batch rendering engine never times out waiting on a resource.

If the render is not finished (435, No), the batch rendering engine may continue working on tasks in the task list, waiting for a response for a request of one or more embedded items, etc. If the render is finished (435, Yes), the batch rendering engine may finalize a rendering result for the requested web page (440) and return the rendering result to the requesting process. Elements of the rendering result may have been previously generated as a result of tasks completed by the batch rendering engine. For example, the list of embedded items fetched and errors encountered while running script may be generated prior to the render being finished. Other elements, such as determining the layout may occur after the render is finished. In some implementations, the batch rendering engine does not determine the layout until after the render is finished unless a script run as part of the rendering process requests the location of an element. Even if the layout is generated prior to the rendering being finished, the batch rendering engine may generate the layout a final time as part of finalizing the rendering result. Thus, finalizing the rendering result may include generating new elements and collecting elements already generated. In some implementations, the batch rendering engine may store the rendering result in a memory and may provide the requesting process with the location of the rendering result. In some implementations, the system may store the rendering result with a timestamp indicating when it was generated and may store more than one version of the rendering result. Process 400 then ends, having generated a rendering result in batch mode, with optimizations for batch processing.

Figure 5:
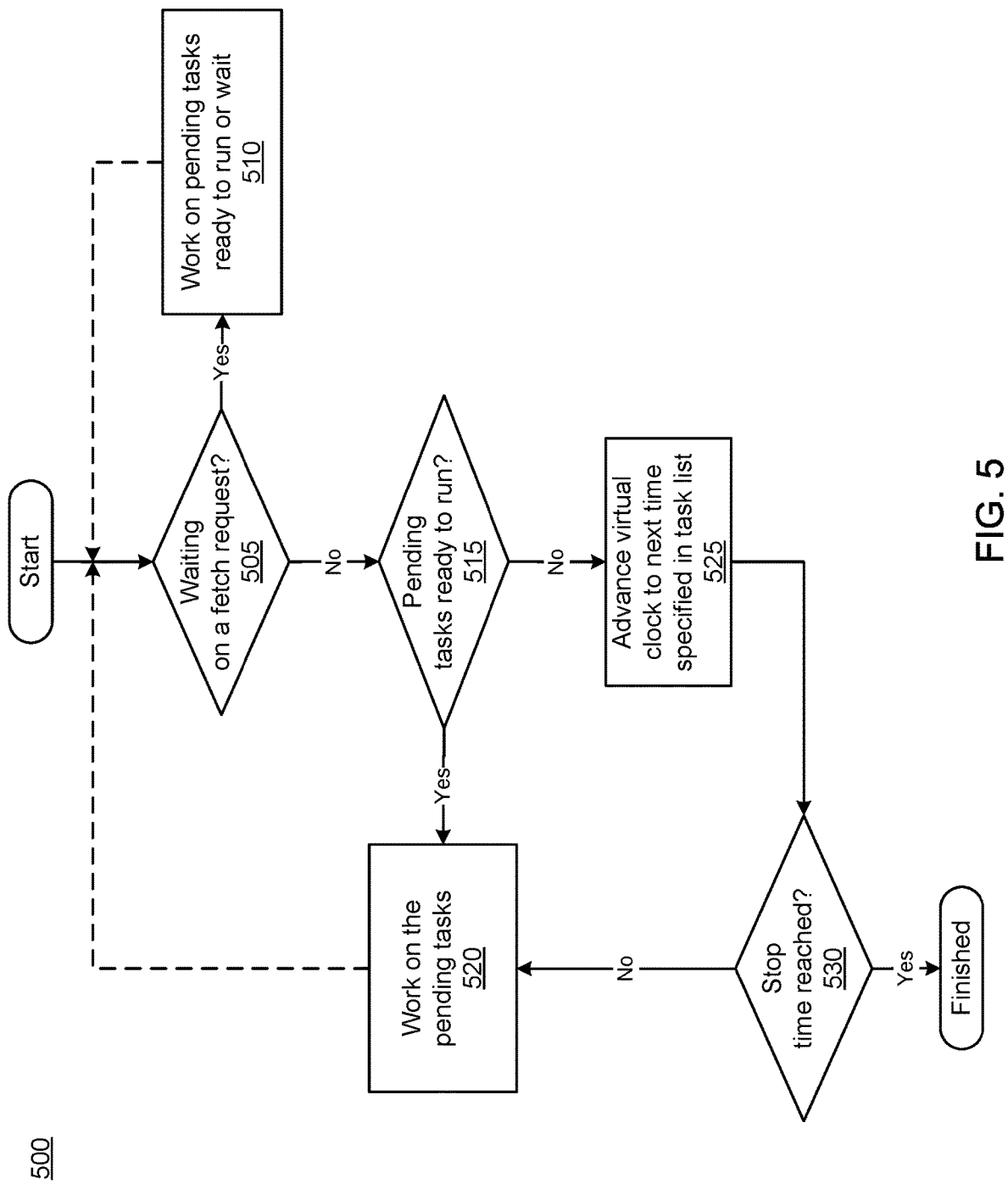
FIG. 5 is a flowchart illustrating an example process by which a batch rendering engine advances a virtual clock, according to an implementation.

FIG. 5 is a flowchart illustrating an example process 500 by which a batch rendering engine advances a virtual clock, according to an implementation. Process 500 may be run as part of determining whether a render is finished (e.g., step 435 of FIG. 4), although it may be run at other times as well (e.g., periodically). Process 500 begins with determining whether the batch rendering engine is waiting for a request of an embedded item (505). For example, if the batch rendering engine requested an embedded item from the fetch server and has not yet received a response from the fetch server, the batch rendering engine is waiting. If the batch rendering engine is waiting (505, Yes), the virtual clock is not advanced and the batch rendering engine may work on tasks ready to run at the current virtual time, if they exist, or may wait (510). This step may be performed as part of step 415 of FIG. 4. If the batch rendering engine is not waiting for a fetch request (505, No), the batch rendering engine may determine whether there are tasks in the task list that are ready to run (515). For example, if a task in the task list has a run time that is equal to the virtual clock, the task is ready to run. If a task is ready to run (515, Yes), the batch rendering engine may work on the task (520). Working on the task may add other tasks to the task list, some of which may be ready to run and others of which may have a run time in the future (e.g., current virtual clock time plus some specified time). This step may also be performed as part of step 415 of FIG. 4. If there are no pending tasks ready to run (515, No), the batch rendering engine may advance the virtual clock to the next run time specified in the task list (525). In other words, the batch rendering engine warps the virtual clock forward so that the next task in line in the task list is ready to run.

If the next task in line in the task list is the Stop task (530, Yes), the rendering is finished. If not, the batch rendering engine may continue to work on pending tasks (520). Process 500 demonstrates how the virtual clock is not advanced while there are pending tasks ready to run or while waiting for a fetch of an embedded item. Thus, the virtual clock "stands still" for these events, which can avoid a class of errors encountered when the a rendering engine uses a real clock. Furthermore, process 500 demonstrates how the virtual clock can be warped forward, so that in some instances the rendering process can take less real-time than timing dictated by the tasks (e.g., waiting for intervals of time to fade-in an image or play an animation). This is especially true when embedded items can be returned without a crawl, as will be explained in more detail herein. Of course, it is understood that the order of checking for pending tasks (515) and fetch requests (505) can be reversed, and implementations are not limited to the order illustrated in FIG. 5.

Figure 6:
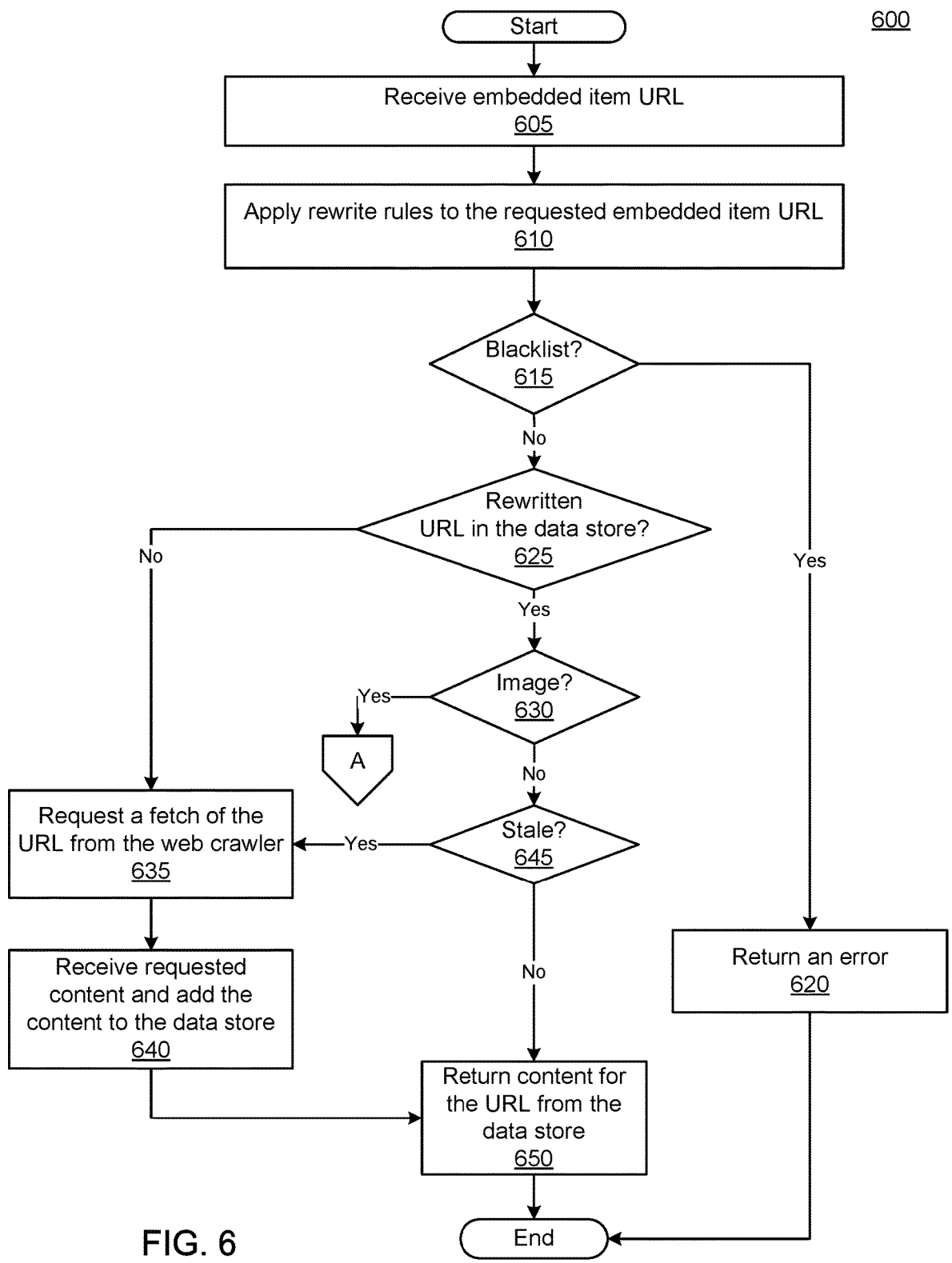
FIG. 6 is a flowchart illustrating an example process by which a fetch server provides content for embedded items to a batch rendering engine, according to an implementation.

FIG. 6 is a flowchart illustrating an example process 600 by which a fetch server provides content of embedded items to a batch rendering engine, according to an implementation. Process 600 may be performed by a system, such as system 100 of FIG. 1. The system may use process 600 to respond to fetch requests for embedded items from a plurality of batch rendering engines. In some implementations, process 600 may be performed by a fetch server and may be initiated in response to a request from one of the batch rendering engines.

Process 600 may begin with the fetch server receiving a URL for an embedded item (605). The URL may be provided by a batch rendering engine and may be one of a plurality of URLs requested by the batch rendering engine. The fetch server may apply rewrite rules to the URL of the requested embedded item (610). The rewrite rules may be URL rewrite rules 154 of FIG. 1. A rewrite rule may include a template and a redirect URL. Applying a rewrite rule may include determining whether the URL matches the pattern or template for one of the rewrite rules. For example, the template may be a URL with any query strings removed and the system may remove the query string from the URL of the requested embedded item to see if it matches the template. As another example, the template may include wild-card characters, e.g., * and ?, that indicate places where any character or characters can match the wild-card characters.

If the URL does match the pattern, the rewrite rule may provide a redirect URL and the fetch server may substitute the URL of the requested embedded item with the redirect URL. One reason for applying rewrite rules is to allow the fetch server to identify URLs that return the same content and to use the redirect URL to avoid having to schedule an unnecessary fetch. Certain types of commonly embedded items have URLs that are dynamically generated. For example, the URLs of some embedded items depend upon a random number that is generated by a random number generator or on a current date and time that is returned by a date and time function. Embedded objects such as these, known as cache-busting tracking URLs, are commonly used to determine the number of unique hits or views of a web page for the purpose of determining advertising costs or revenues. While the contents of such embedded objects are usually identical, a unique URL is generated for the object each time it is discovered by a rendering engine. Thus, for web pages containing such embedded items, the rendering engine will see a new and different URL for the object each time it tries to render the web page, and without applying rewrite rules the fetch server would fetch the same content over and over. To avoid this, the re-write rules may apply templates that allow the fetch server to identify these URLs and redirect a fetch request to previously-fetched content stored under a redirect URL.

Another reason to apply rewrite rules is to identify blacklisted URLs. The rewrite rules may also include rules that identify blacklisted URLs, or a pattern or template for blacklisted URLs. For example, the rewire rule may include a template and an associated redirect URL, error, or flag. If the URL for the requested embedded item matches a blacklisted URL or a template for a blacklisted URL, the fetch server may identify the URL as blacklisted. In some implementations, applying the rewrite rules may cause the URL to be replaced with a redirect URL. In some implementations, applying the rewrite rules may flag the URL as blacklisted, or may provide an error to return as the response to the request for the embedded item identified by the URL.

If the URL is blacklisted (615, Yes), the fetch server may return an error to the requesting batch rendering engine (620). The error may be a standard browser error indicating the resource could not be found, or a specific error that tells the rendering engine that the resource is not needed or can be skipped, etc. The error may be provided by the matching rewrite rule, from the embedded item table if the rewrite rule provided a redirect URL, selected based on a flag in the rewrite rule, hard coded, etc. The fetch request for this URL is then complete and process 600 ends.

If the URL is not blacklisted (615, No), the fetch server may look for the rewritten URL in the embedded items data store (625). The embedded items data store may be embedded item table 152 of FIG. 1. The rewritten URL may be the redirect URL provided by the rewrite rules, if the original URL matched a pattern identified in the rewrite rules. The rewritten URL may be the original URL if the URL did not match any templates in the rewrite rules. If the URL is in the embedded item data store (625, Yes), the fetch server may optionally determine whether the requested URL is for an image (630). This is optional, and in implementations that do not test for an image, step 630 can be omitted. Whether the requested embedded item is an image can be determined based on information in the request, the URL itself, or based on a field in the embedded item data store for the rewritten URL. If the embedded item is an image (630, yes), the system may look in dimensions table for the dimensions of the image and return a mock-image having the dimensions, as explained in more detail with regard to process 700 of FIG. 7. It is also understood that in some implementations, the fetch server may perform step 630 prior to applying rewrite rules, prior to looking the embedded item data store, or after determining if the entry is stale.

If the requested embedded item is not an image (630, No), the fetch server may determine whether the entry in the embedded items table is stale (645). Whether an entry is stale or not may depend on several factors, such as the change rate of the item, the type of embedded item (e.g., a script, style sheet, image, etc.), the importance of the web page that the browser rendering engine is rendering, etc. In some implementations, the embedded item table may have a field or value that indicates the entry never goes stale, e.g., for a redirect URL of a blacklisted embedded item. If the entry is not stale (645, No), the fetch server may return the content in the embedded item table for the rewritten URL to the requesting batch rendering engine (650) and process 600 ends for this embedded item. In some implementations, returning the content may include the fetch server providing the location of the entry in the embedded item table as the response, and the batch rendering process accessing the content using the location.

If the entry in the embedded item table is stale (645, Yes) or if the rewritten URL is not in the embedded item data store (625, No), the fetch server may request a fetch of the URL from the web crawler, e.g., web-crawling engine 130 of FIG. 1 (635). When the fetch server receives the crawled content, it may store the received content, without massaging or further processing, as an entry in the embedded item data store (640). In some implementations, the fetch server can save the content and crawl time of the embedded item without overwriting the content and crawl time of a previous crawl of the embedded item. In some implementations, the fetch server may keep one entry in the embedded item table and may not preserve a previous crawl of the embedded item. Regardless, once saved in the embedded item table the content is cached and does not need to be fetched again until it becomes stale. The fetch server may then return the fetched content to the requesting batch rendering engine (650) and process 600 ends.

Figure 7:
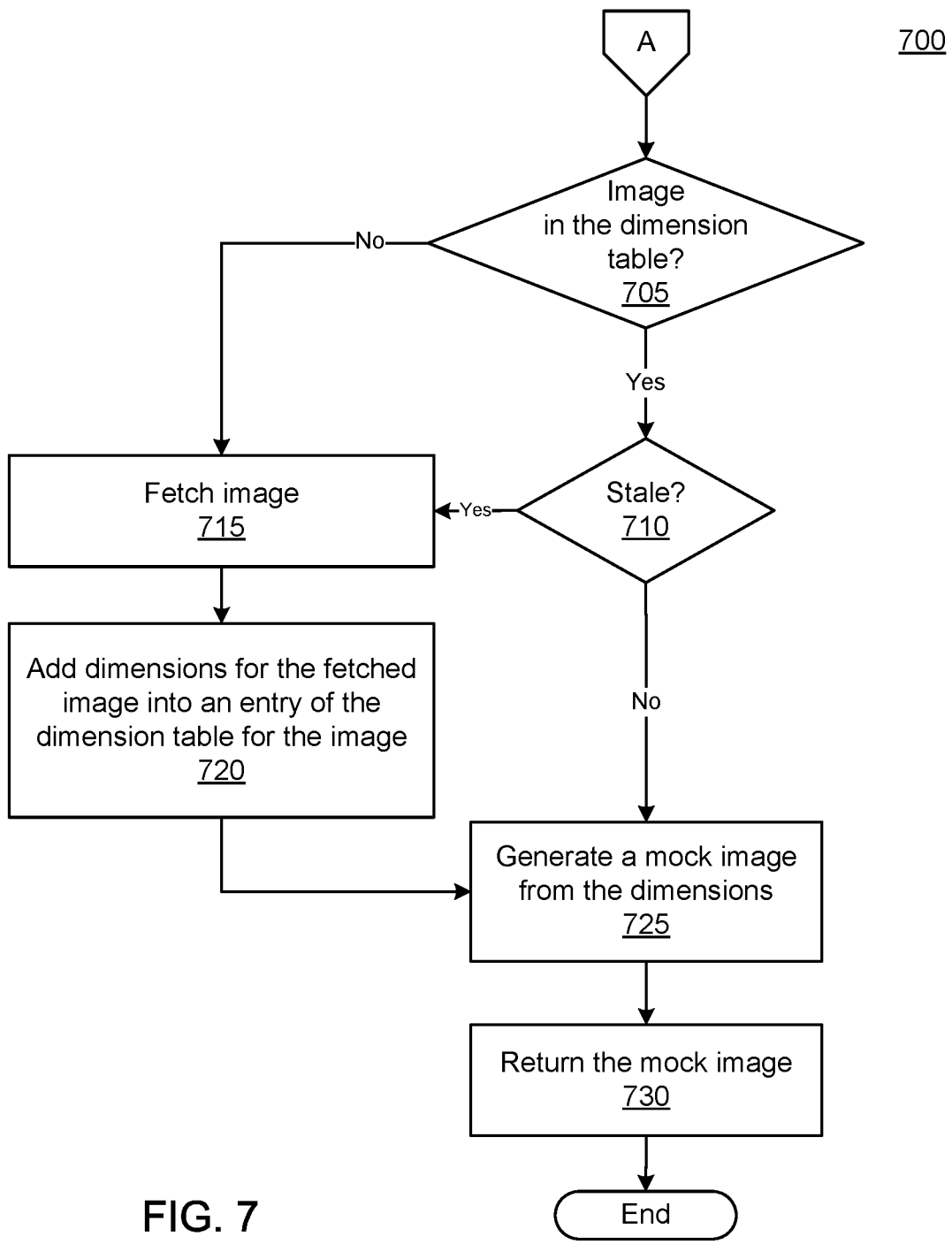
FIG. 7 is a flowchart illustrating an example process by which a fetch server provides mock images to a batch rendering engine, according to an implementation.

FIG. 7 is a flowchart illustrating an example process 700 by which a fetch server provides mock images to a batch rendering engine, according to an implementation. Process 700 may be performed by a system, such as system 100 of FIG. 1. The system may use process 700 to respond to fetch requests for images embedded in a web page from a plurality of batch rendering engines. In some implementations, process 700 may be performed by a fetch server and may be initiated in response to a request from one of the batch rendering engines. In some implementations, the fetch server may execute process 700 independently of other embedded items (e.g., process 600 of FIG. 6). In other implementations, the fetch server may incorporate elements of process 700 into a process that includes other embedded items, e.g., process 600 of FIG. 6.

Process 700 may begin with the fetch server determining whether the requested image has an entry in an image dimensions table (705). The image dimensions table may be the image dimension table 156 of FIG. 1. The image dimensions table includes dimensions for the image, which are stored by an identifier, such as the URL, for the image. If the image is not in the dimensions table (705, No), or if the image is in the dimensions table (705, Yes) but is stale (710, Yes), the fetch server may schedule a fetch of the image (715), for example via a web-crawling engine such as web-crawling engine 130 of FIG. 1. In some implementations, the fetch server may use information in the dimensions table to determine whether the entry is stale. In some implementations, the fetch server may use information from a separate embedded items table, as described above with regard to step 645 of FIG. 6, to determine if the dimensions are stale. Thus, in some implementations, the fetch server may perform step 710 in conjunction with or as part of step 645 of FIG. 6. When the content for the image is received, the fetch server may add an entry for the image into the dimensions table, the entry including the dimensions for the fetched image (720). In some implementations, the fetch server may also store the fetched content in an embedded items table, as described above as part of step 640 of FIG. 6.

If the image is in the dimensions table (705, Yes) and is not stale (710, No) or after the image has been fetched and stored (720), the system may generate a mock image using the dimensions from the dimensions table (725). The mock image may have image file format data that specifies the same dimensions as the requested image but empty content. The system may return the mock image (730) to the requesting batch rendering engine and process 700 ends.

It is understood that in some implementations, some of the steps of process 700 may be optional or performed as part of other processing. For example, determining whether the dimensions for the image are stale may be performed as part of step 645 of FIG. 6 and may be based on information in an embedded items table. Additionally, step 715 may be performed as part of, or in conjunction with step 635 of FIG. 6. In other words, the fetch server may combine aspects of process 700 with aspects of process 600, such as fetching content for images, determining whether cached fetched content is stale, etc. Of course, the fetch server may also perform process 700 completely independent of process 600. Thus, implementations may include variations of process 700.

FIG. 8 shows an example of a generic computer device 800, which may be operated as system 100, and/or client 170 of FIG. 1, which may be used with the techniques described here. Computing device 800 is intended to represent various example forms of computing devices, such as laptops, desktops, workstations, personal digital assistants, cellular telephones, smart phones, tablets, servers, and other computing devices, including wearable devices. The components shown here, their connections and relationships, and their functions, are meant to be examples only, and are not meant to limit implementations of the inventions described and/or claimed in this document.

Computing device 800 includes a processor 802, e.g., a silicone-based hardware processor, memory 804, a storage device 806, and expansion ports 810 connected via an interface 808. In some implementations, computing device 800 may include transceiver 846, communication interface 844, and a GPS (Global Positioning System) receiver module 848, among other components, connected via interface 808. Device 800 may communicate wirelessly through communication interface 844, which may include digital signal processing circuitry where necessary. Each of the components 802, 804, 806, 808, 810, 840, 844, 846, and 848 may be mounted on a common motherboard or in other manners as appropriate.

The processor 802 can process instructions for execution within the computing device 800, including instructions stored in the memory 804 or on the storage device 806 to display graphical information for a GUI on an external input/output device, such as display 816. Display 816 may be a monitor or a flat touchscreen display. In some implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk. In some implementations, the memory 804 may include expansion memory provided through an expansion interface.

The storage device 806 is capable of providing mass storage for the computing device 800. In one implementation, the storage device 806 may be or include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also include instructions that, when executed, perform one or more methods, such as those described above. The computer- or machine-readable medium is a storage device such as the memory 804, the storage device 806, or memory on processor 802.

The interface 808 may be a high speed controller that manages bandwidth-intensive operations for the computing device 800 or a low speed controller that manages lower bandwidth-intensive operations, or a combination of such controllers. An external interface 840 may be provided so as to enable near area communication of device 800 with other devices. In some implementations, controller 808 may be coupled to storage device 806 and expansion port 814. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 830, or multiple times in a group of such servers. It may also be implemented as part of a rack server system. In addition, it may be implemented in a personal computer such as laptop computer 832, desktop computer 834, or smart phone 836. An entire system may be made up of multiple computing devices 800 communicating with each other. Other configurations are possible.

FIG. 9 shows an example of a generic computer device 900, which may be system 100 of FIG. 1, which may be used with the techniques described here. Computing device 900 is intended to represent various example forms of large-scale data processing devices, such as servers, blade servers, datacenters, mainframes, and other large-scale computing devices. Computing device 900 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing device 900 may include any number of computing devices 980. Computing devices 980 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 980a includes multiple racks 958a-958n. Each rack may include one or more processors, such as processors 952a-952n and 962a-962n. The processors may include data processors, network attached storage devices, and other computer controlled devices. In some implementations, one processor may operate as a master processor and control the scheduling and data distribution tasks. Processors may be interconnected through one or more rack switches 958, and one or more racks may be connected through switch 978. Switch 978 may handle communications between multiple connected computing devices 900.

Each rack may include memory, such as memory 954 and memory 964, and storage, such as 956 and 966. Storage 956 and 966 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 956 or 966 may be shared between multiple processors, multiple racks, or multiple computing devices and may include a computer-readable medium storing instructions executable by one or more of the processors. Memory 954 and 964 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 954 may also be shared between processors 952a-952n. Data structures, such as an index, may be stored, for example, across storage 956 and memory 954. Computing device 900 may include other components not shown, such as controllers, buses, input/output devices, communications modules, etc.

An entire system, such as system 100, may be made up of multiple computing devices 900 communicating with each other. For example, device 980a may communicate with devices 980b, 980c, and 980d, and these may collectively be known as system 100. As another example, system 100 of FIG. 1 may include one or more computing devices 900. Some of the computing devices may be located geographically close to each other, and others may be located geographically distant. The layout of computing device 900 is an example only and the system may take on other layouts or configurations.

Various implementations can include implementation in one or more computer programs that are executable and/or interpretable on a programmable system including at least one programmable processor formed in a substrate, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer system comprising:
   at least one processor; and
   a batch rendering engine configured to, without user input:
      receive a request to render a web page from a requesting process,
      initialize a virtual clock for the web page,
      generate a task list for rendering the web page, wherein each task in the task list has an associated start time,
      add a stop task to the task list, the stop task having a start time set to a predetermined time,
      perform the tasks in the task list according to the virtual clock for the web page, wherein the virtual clock for the web page advances independently of real time by being set to a time represented by a next-occurring task in the task list for the web page, the virtual clock remaining unchanged while a pending task in the task list has a run time matching the virtual clock,
      generate a rendering result for the web page when the virtual clock matches the start time for the stop task in the task list, and
      provide the rendering result to the requesting process.

2. The computer system of claim 1, wherein the predetermined time is a predetermined time added to the virtual clock.

3. The computer system of claim 1, wherein the task list includes a first task with a first start time and a second task with the first start time, the first task being a fetch of an embedded resource, and the rendering engine is further configured to:
   request the embedded resource from a server; and
   work on the second task while waiting for a response to the request for the embedded resource.

4. The computer system of claim 3, wherein the batch rendering engine is further configured to:
   receive content for the embedded resource from the server; and
   add a third task to the task list, responsive to receiving the content for the embedded resource, the third task having a respective start time set equal to a current value of the virtual clock.

5. The computer system of claim 4, wherein the third task runs a script identified in the content for the embedded resource.

6. The computer system of claim 4, wherein the third task fetches a second embedded item identified in the content.

7. The computer system of claim 1, wherein actual time spent processing the task list for a web page that lacks an embedded item is less than the predetermined time.

8. The computer system of claim 1, wherein the start time of the stop task is set independent of start times of other tasks in the task list.

9. A method comprising:
   receiving a request, from a requesting process, to render a web page;
   initializing, using at least one processor, a virtual clock for the web page;
   generating a task list with at least two tasks for rendering the web page, wherein each task has an associated start time;
   adding a stop task with a start time that is independent of a final task in the task list;
   performing the tasks in the task list according to the virtual clock for the web page, wherein the virtual clock for the web page advances independently of real time by advancing to a time represented by a next-occurring task in the task list without user input;

generating, using the at least one processor, a rendering result for the web page when the virtual clock matches a run time for the stop task in the task list; and providing the rendering result to the requesting process.

10. The method of claim 9, wherein the start time of the stop task is set to a predetermined time.

11. The method of claim 10, wherein the predetermined time is a time added to the initialized virtual clock.

12. The method of claim 10, wherein the predetermined time for the stop task represents an average web page loading time.

13. The method of claim 9, further comprising:
identifying an embedded item in the web page;
requesting content for the embedded item;
receiving, in response to the request for content, the content; and
adding a task to the task list for processing the content, the added task having a start time equal to the virtual clock.

14. The method of claim 13, wherein outstanding requests for embedded items are not complete tasks.

15. The method of claim 13, wherein requesting the content for the embedded item includes:
responsive to a task to the task list for processing the content, the added task having a start time equal to the virtual clock.

16. The method of claim 13, wherein the start time of the stop task represents a predetermined time added to the initialized virtual clock and actual time spent processing the task list is greater than the predetermined time, due to an amount of time waiting for the content.

17. The method of claim 9, wherein the virtual clock advances to a time represented by the next-occurring task in the task list upon determining that all tasks with a start time equal to the virtual clock are complete.

* * * * *

UNITED STATES PATENT AND TRADEMARK OFFICE
CERTIFICATE OF CORRECTION

PATENT NO. : 11,328,114 B2
APPLICATION NO. : 15/990741
DATED : May 10, 2022
INVENTOR(S) : Xu et al.

It is certified that error appears in the above-identified patent and that said Letters Patent is hereby corrected as shown below:

In the Claims

In Column 22, Claim 1, Line 5, insert --rendering-- before "the".

In Column 22, Claim 1, Line 6, insert --with at least two tasks-- before "for".

In Column 22, Claim 3, Line 28, insert --batch-- before "rendering".

Signed and Sealed this
Third Day of January, 2023

Katherine Kelly Vidal
*Director of the United States Patent and Trademark Office*